Aug. 9, 1932.  W. D. FOSTER  1,871,232
CONTAINER FOR FILMS AND MEANS FOR HANDLING THE SAME
Filed Jan. 16, 1929
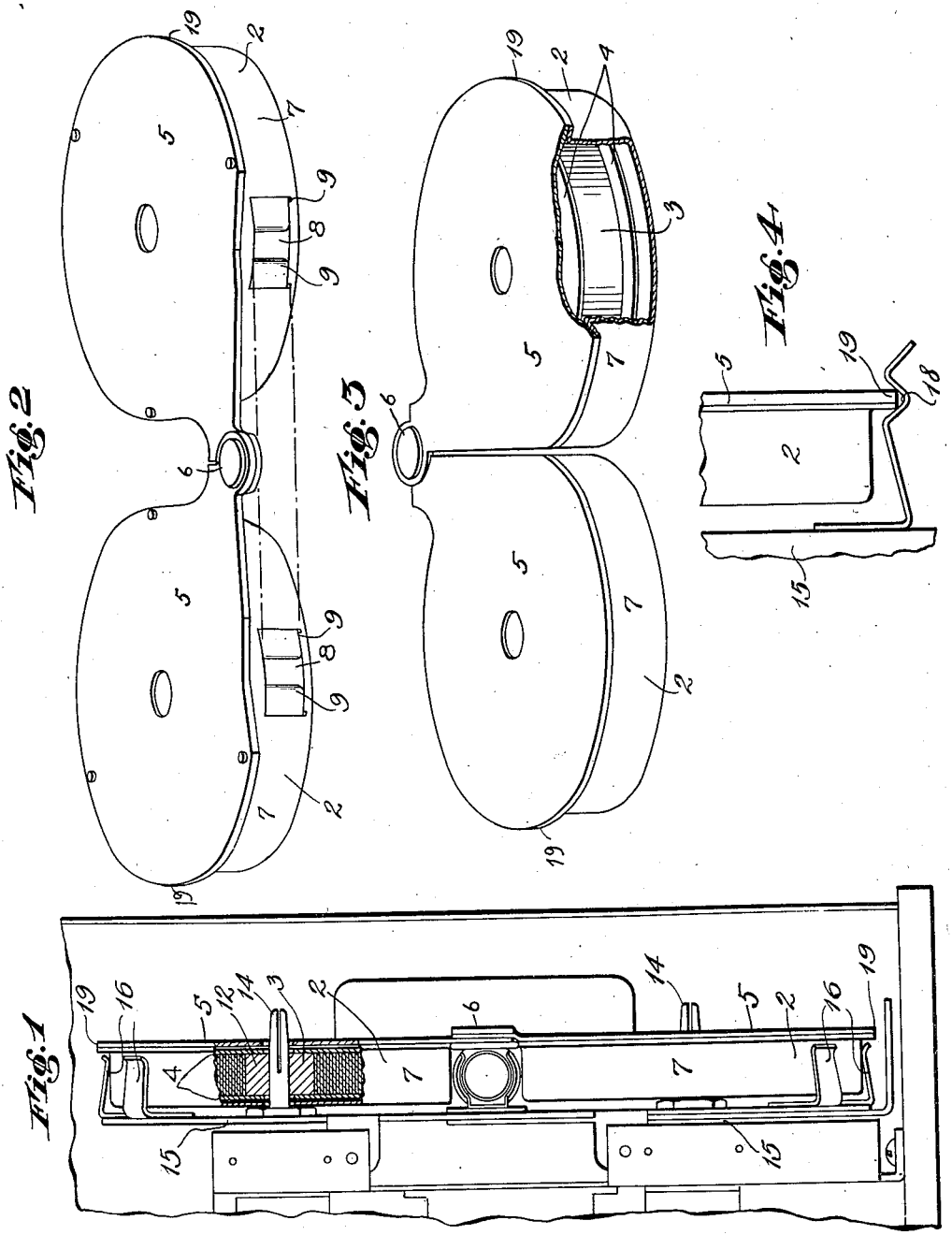
INVENTOR.
WARREN DUNHAM FOSTER
BY Waldo G. Morse
ATTORNEYS.

Patented Aug. 9, 1932

1,871,232

UNITED STATES PATENT OFFICE

WARREN DUNHAM FOSTER, OF WASHINGTON TOWNSHIP, BERGEN COUNTY, NEW JERSEY, ASSIGNOR, BY MESNE ASSIGNMENTS, TO KINATOME PATENTS CORPORATION, OF NEW YORK, N. Y., A CORPORATION OF NEW YORK

CONTAINER FOR FILMS AND MEANS FOR HANDLING THE SAME

Application filed January 16, 1929. Serial No. 332,840.

My invention can be applied to any art in which material is fed from or to a carrier, and is particularly useful in connection with carriers for films, whether for light sensitive material adapted for use with a camera or sound recording apparatus or for image bearing material adapted for use with a motion picture or stereopticon projector or with a sound reproducing instrument or with an apparatus adapted for the simultaneous reproduction of visual images and sound.

My invention includes a means whereby both the outer protective casing and the inner spool of a film holder may be supported upon the film handling mechanism with which the film holder is used, each independently of the other. Such a provision of independent supports for the inner film receiving member and the outer protective casing makes it possible for a relatively cheap structure to be employed, without the disadvantages which inevitably arise in case there is friction between the film spool and the outer casing. If the film holder is placed upon the spindle of the film handling mechanism as has been common in the past and no special provision is made for avoiding the friction which results from the carrying of the weight of the holder upon the inner spool or upon the spindle, improper conditions of feeding quickly result since under such conditions the fragile film is subjected to increased tension due to this friction.

Devices in which friction between the outer casing and the inner spool is avoided by the use of special means so that it is entirely practical to position and support such an entire holder on the revoluble spindle of a film handling apparatus have been proposed. An example of such a device is a magazine which consists of an outer case and an inner film supporting member permanently journalled therein. My present invention has for one of its objects the provision of means whereby the relatively expensive structure disclosed by the above mentioned devices may be avoided.

I am aware that means for locating or positioning the outer protective casing and the inner film spool independently of each other are known. My present invention has for one of its objects the provision of means whereby such outer protective casing and inner film spool may be supported independently of each other, the means for accomplishing the independent supporting of the protective casing and spool becoming automatically effective upon the placing of the film holder in assembled relation with film handling mechanism. My invention eliminates the necessity for the provision of a separate mechanism which must be operated by a distinct hand operation to hold and support the outer casing independently of the inner spool after such casing and spool have been located independently of each other.

I may choose to apply my invention to a double magazine or to a single magazine of the type described in the co-pending application of Barton Allen Proctor, Serial Number 54,910 filed September 8, 1925 from which divisional applications Serial Numbers 332,881 and 332,884 have been filed January 16, 1929 or to a film holder of the type described in the application Serial Number 332,882 of Barton Allen Proctor, Edith Dunham Foster and Clarkson Ulysses Bundick filed January 16, 1929 or to any other desired type of film holder.

Other objects, advantages and characteristics are apparent in the following description, the attached drawing, and the subjoined claims. Although I am showing one preferred embodiment of my invention, it will be readily understood that I am not limited to this particular construction as changes can readily be made without departing from the spirit of my invention or the scope of my broader claims.

In the drawing: Figure 1 is a view of one type of film holder supported in a film handling mechanism in accordance with my invention.

Figure 2 is a perspective view of the same.

Figure 3 is a view similar to Figure 2 showing the film holder in closed position.

Figure 4 is a detail view in section and to enlarged scale of one preferred form of my invention as applied to a film holder.

A film holder for use with the present invention may comprise a plurality of containers 2, in each of which there may be mounted a spool 3 with conventional side plates 4 of suitable construction. Each of the containers may be provided with plates 5 projecting therefrom and hingedly connected in any desired manner as by hinges 6, permitting the containers 2 to be swung from and toward each other about the axis of the hinges. The positioning of the plates 5 and the hinges may be such that when the containers are moved away from each other as shown in Figure 2 they will be in the correct relative positions required by the particular film handling apparatus with which the holder is to be used. To such plates 5, the casings 7 may be suitably attached. In order to provide the necessary strength and rigidity the plates 5 may be constructed of relatively heavy metal, and the casings, in order to save weight and expense, may be relatively much lighter.

Each of the containers 2 may be closed on its periphery except for a small opening 8 through which the film passes. These openings may be so positioned relative to the pivotal axis 6 that when the containers are moved toward each other to the closed position shown in Figure 3 the length of film exposed between them is reduced. Each of the openings may be provided with surfaces 9 of suitable construction adapted when swung together to provide a complete inclosure for the film. A light trap may be provided.

Both the hub 12 of the inner spool 3 and the side plates 4 may be provided with coaxial openings whereby the spindle, mounted in any desired manner upon the projecting apparatus, may be introduced.

As shown in Figures 1 and 4, I may provide means for supporting the outer protective casing independently of the film spool. On the face 15 of the film handling apparatus I may place a suitable number of forwardly extending springs 16 the outer ends of which are bent slightly outwardly. It will be readily understood that as the film holder is moved toward the wall 15 of the apparatus, the spindle 14 enters the coaxial openings of the film spool and of the container, the springs 16 are slightly displaced by the holder, and when the holder has been moved inwardly as against the side of the apparatus, the pressure of the springs against the outer protective casing will completely support the casing. As is clearly shown in Figure 4, the springs are preferably of a construction as indicated to provide an offset portion 18 in each spring adapted to snap over and at least partially embrace an extending rim portion 19 of the plate 5 of the container. In this manner the containers are held in the desired concentric relation to the spindles as well as in the desired axial position relative thereto.

It will be readily understood that the entire weight of the film spools is supported by the spindles 14, wholly independently of the outer casing, and of its supporting means.

Certain advantages of my invention have been stated in the above portion of this specification. Other advantages include the independent positioning and supporting of the outer protective casing and the inner film spool of a film holder independently of each other, both axially and radially or circumferentially.

I claim:

1. Film handling apparatus, including a film container having a spindle receiving opening therein, and mechanism mounted on said apparatus and adapted to engage said container for maintaining said opening in the desired operative position, said mechanism including a resilient member comprising an outer portion inclined away from the axis of said opening and an inner portion first offset from said first mentioned portion and then bent toward said axis.

2. In a film handling apparatus, a spindle adapted to support a film spool, a film holder comprising a container, a film spool movable therewithin and relatively thereto, said container and said spool having aligning openings for the reception of said spindle, and mechanism for supporting said container independently of said spool, said mechanism including an inner portion adapted to engage said container and support the same and an outer portion inclined away from the axis of such opening whereby said container is guided into cooperative relation with such inner portion as said container is being placed in assembled relation with said apparatus.

3. Film handling apparatus, including a main frame and a spindle extending therefrom at substantially right angles thereto and adapted to support a film spool, a film container, a film spool movable therewith in and relatively thereto, said container and said spool having aligning openings for the reception of said spindle, and spring means mounted upon said frame and extending therefrom at substantially a right angle thereto and adapted to engage said container at points on the periphery thereof and to maintain said opening therein in the desired operative position.

4. Film handling apparatus, including a spindle adapted to support a film spool, a container, a film spool movable therewithin and relatively thereto, said container and said spool having aligning openings for the reception of said spindle, and spring members mounted upon said apparatus and projecting therefrom in parallel relation to said spindle and spaced therefrom a distance substantially equal to the distance between such opening in said container and the periphery thereof and adapted to engage said container and to maintain said opening in the desired operative position.

5. Film handling apparatus, including a main frame and a spindle mounted thereupon and projecting therefrom at right angles thereto and adapted to support a film spool, a container, a film spool movable within said container and relatively thereto, said container and said spool having aligning openings for the reception of said spindle, and spring means mounted upon said frame in parallel and spaced relation to said spindle and adapted to support said container independently of said spool.

6. Film handling apparatus, including a supporting frame and a spindle extending therefrom at right angles thereto and adapted to support a film spool, a container, a film spool movable within said container and relatively thereto, said container and said spool having aligning openings for the reception of said spindle, and spring means mounted upon said frame and extending therefrom at right angles thereto and engaging said container and adapted to maintain said opening in the desired operative position.

7. Film handling apparatus, including a supporting frame, a spindle mounted upon said frame and extending therefrom at right angles thereto and adapted to support a film spool, a container, a film spool movable therewithin and relatively thereto, said container and said spool having aligning openings for the reception of said spindle, and spring means mounted upon said frame and extending therefrom in the same direction as said spindle in spaced and parallel relation thereto and adapted to engage the periphery of said container and to support said container independently of said spool.

8. Film handling apparatus including a film holder comprising a container and a film spool positioned therewithin and movable relatively thereto, a spindle adapted to support said spool, and mechanism adapted to support said container independently of said spool, said mechanism including a member mounted upon said apparatus and extending therefrom in the same direction as said spindle, said member including a body portion positioned substantially parallel to the axis of said spindle and an outwardly terminal portion inclined at an angle from said body portion in a direction away from the axis of said spindle for the purpose of guiding said film holder into operative relation with said apparatus by a single bodily movement of said container substantially parallel to the axis of said spindle.

9. Film handling apparatus, including a film container having a spindle receiving opening therein, and mechanism mounted on said apparatus and adapted to engage said container for maintaining said opening in the desired operative position, said mechanism including a resilient member comprising an outer portion inclined away from the axis of said opening and an inner portion first offset from said first mentioned portion, then bent toward said axis, and thereafter bent away from said axis and secured to said apparatus.

10. Film handling apparatus, including a film container having a spindle receiving opening therein, and mechanism mounted on said apparatus and adapted to engage said container and to maintain said opening in the desired operative position, said mechanism including a resilient member comprising an outer portion inclined toward the axis of said opening and an inner portion first offset from said first mentioned portion and then bent away from said axis.

11. In film handling apparatus, a carrier and means adapted for removably supporting said carrier upon said apparatus, said carrier comprising two substantially closed film receiving housings and a supporting plate, said housings being attached to said plate in such manner as to provide an opening therebetween through which a beam of light may be projected for cooperation with a film passing between one of said housings and the other, and said plate extending beyond said housings and including a bearing surface constructed for cooperation with said carrier supporting means.

12. In film handling apparatus, a substantially flat main frame having a spindle extending therefrom normal thereto, a film protecting housing having an opening therein adapted to cooperate with said spindle, a flat plate upon which said housing is mounted which extends laterally beyond said housing, and mechanism supported upon said apparatus adapted to engage the edge of said plate and to maintain said plate substantially parallel to said frame, said mechanism being constructed to be rendered immediately effective by the act of placing the container in assembled relation with the apparatus.

13. In film handling apparatus, a flat main plate having a spindle extending therefrom normal thereto, a film container including an enclosing housing having an opening therein adapted to cooperate with said spindle and being formed with a flat side which extends laterally beyond said housing, and spring means supported upon said apparatus adapted to engage the edge of said side and to maintain said side substantially parallel to said plate.

14. In a film handling apparatus, a film container including a film receiving housing having a spindle receiving opening therein and mounted upon a flat plate extending laterally beyond said housing and supporting mechanism for said container, said mechanism including a resilient member supported by said apparatus and comprising an outer portion inclined away from the axis of said spindle receiving opening and an inner portion first off-set from said outer portion and then bent toward said axis whereby said outer portion, as said container is placed in assembled relation with said apparatus, cooperates with said flat plate to guide said plate into relation with said inner portion and said inner portion thereupon supports said container in the desired relation to said apparatus.

15. In a film handling apparatus, a substantially flat main frame, a film container including a film protecting housing having a spindle receiving opening therein mounted upon a flat plate extending laterally beyond said housing, and supporting mechanism for said container, said mechanism including a plurality of resilient members each comprising an outer portion inclined away from the axis of said spindle receiving opening and an inner portion first off-set from said outer portion, then bent toward said axis and thereafter bent away from said axis and secured to said apparatus, whereby said outer portions, as said container is placed in assembled relation with said apparatus, cooperate with said flat plate to guide said side into relation with said inner portions and said inner portions thereupon support said container in spaced and parallel relation to said main frame.

16. In film handling apparatus, a spindle adapted to support a film spool, a film holder comprising a film protecting housing mounted upon a flat plate which extends laterally therebeyond, a film spool movable therewithin and relatively thereto, said container and said spool having aligning openings for the reception of said spindle, and mechanism adapted for cooperation with the portion of said plate which extends beyond said container whereby said container is supported by said mechanism independently of said spool when said film holder is placed in assembled relation with said apparatus.

17. Film handling apparatus and a film container for use therewith, said container having a spindle receiving opening therein, and said apparatus including a main supporting frame, a spindle extending therefrom at right angles thereto, and a plurality of springs mounted upon said frame and extending therefrom in a direction substantially parallel to that in which said spindle extends and adapted to engage the periphery of said container for maintaining the edge of said opening in spaced relation to said spindle.

18. Film handling aparatus and a film container for use therewith, said container including a housing formed with a spindle receiving opening therein and said apparatus including a frame, a spindle extending therefrom in a direction substantially at right angles thereto, and a plurality of members for supporting said container upon said apparatus, said members being mounted upon said frame for movement relatively thereto, each member being movable toward and from the axis of said spindle and including surfaces so constructed and arranged as to engage said housing as said container is being placed in assembled relation with said apparatus for guiding said container into a predetermined position relatively thereto and thereafter to support said container in such position.

19. Film handling apparatus and a film container for use therewith, said container including a housing formed with a spindle receiving opening therein and said apparatus including a frame, a spindle extending therefrom in a direction substantially at right angles thereto, and a plurality of springs for supporting said container upon said apparatus, said springs being mounted upon said frame and spaced from said spindle a distance substantially equal to the distance between said spindle receiving opening and the periphery of said container and having portions thereof adapted to engage said container upon the periphery thereof, the engaging portions of said springs being inclined in a direction away from the axis of said spindle whereby said container is guided into cooperative relation with said springs as said container is placed in assembled relation with said apparatus by a movement thereof in a direction substantially parallel to the axis of said spindle.

20. Film handling apparatus and a film container for use therewith, said container including a housing formed with a spindle receiving opening therein and said apparatus including a frame, a spindle extending therefrom in a direction substantially at right angles thereto, and mechanism for supporting said container upon said apparatus, said mechanism including a structure spaced from said spindle a distance substantially equal to the distance between said spindle receiving opening and the periphery of said housing and having a portion thereof adapted to engage said housing upon the periphery thereof, the engaging portion of said structure being inclined in a direction away from the axis of said spindle whereby said housing is guided into cooperative relation with said supporting structure as said container is placed in assembled relation with said apparatus by a movement thereof in a direction substantially parallel to the axis of said spindle.

21. Film handling apparatus and a film container for use therewith, said container comprising a housing formed with a spindle receiving opening therein and said apparatus including a frame, a spindle extending therefrom in a direction substantially at right angles thereto, and mechanism for supporting said container upon said apparatus, said mechanism including a structure spaced from said spindle a distance substantially equal to the distance between said spindle receiving opening and the periphery of said housing and having a portion thereof adapted to engage said housing upon the periphery thereof, such engaging portion of said structure and the portion of said housing cooperating therewith being constructed with surfaces arranged in diverging planes whereby said housing is guided into cooperative relation with said supporting structure as said container is placed in assembled relation with said apparatus.

22. In a film holder, the combination of two substantialy closed housings, a hinged plate, one of said housings being supported upon said plate upon one side of said hinge and the other of said housings being supported upon said plate upon the other side of said hinge and extending therefrom in the same direction as that in which first mentioned housing extends, said hinge permitting said containers to be secured close together for storage purposes or to be spaced apart to expose a length of film between them, and said supporting plate extending laterally beyond those portions of the peripheries of said containers which are relatively remote from said hinge.

23. In a film handling apparatus, a film container, including a housing formed with a spindle receiving opening therein and with a flat member which forms one side of said housing and projects therebeyond, and means supported by said apparatus and so disposed as to engage such portion of said flat member as projects beyond said housing at points on the periphery thereof for maintaining said opening in the desired operative position when said container is disposed in assembled relation to said apparatus.

24. In a film handling apparatus, a film container, including a housing formed with a spindle receiving opening therein and with a flat member which forms one side of said housing and projects therebeyond, and means supported by said apparatus and so disposed as to engage such portion of said flat member as projects beyond said housing at points on the periphery thereof for maintaining the edge of said opening in spaced relation to said spindle when said container is disposed in assembled relation to said apparatus.

25. In a film handling apparatus, a film container, including a housing formed with a spindle receiving opening therein and with a flat member which forms one side of said housing and projects therebeyond, and spring means supported by said apparatus and so disposed as to engage the portion of said flat member which projects beyond said housing at points on the periphery thereof for maintaining said opening in the desired operative position when said container is disposed in assembled relation to said apparatus.

26. In a film handling apparatus, a film container, including a housing formed with a spindle receiving opening therein and with a flat member which forms one side of said housing and projects therebeyond, and spring means supported by said apparatus and so disposed as to engage the portion of said flat member which projects beyond said housing at points on the periphery thereof for maintaining the edge of said opening in spaced relation to said spindle when said container is disposed in assembled relation to said apparatus.

27. In a film handling apparatus, a main frame, a spindle projecting therefrom at right angles thereto and adapted to support a film spool, a film magazine comprising an outer protective container and an unmounted inner spool therewithin and bodily movable relatively thereto, said spool and said container including aligning openings for the reception of said spindle, and means for positioning said container in spaced and parallel relation to said frame, said means comprising a plurality of members mounted upon said frame and projecting therefrom in the same direction as said spindle and substantially parallel thereto and so formed and disposed as necessarily to engage said container as said spindle is inserted into said openings and guide said container relatively to said spindle and bring said spindle receiving openings into axial alignment, each of said members including a stop formation so disposed thereupon as to limit the movement of said container toward said frame whereby said container is positioned in such spaced and parallel relation.

28. In a film handling apparatus, a main frame, a spindle projecting therefrom at right angles thereto and adapted to support a film spool, a film magazine comprising an outer protective container and an inner spool movable therewithin and relatively thereto, said member and said container including aligning openings for the reception of said spindle, and means for supporting said container upon said apparatus in spaced and parallel relation to said frame, said means comprising a plurality of springs mounted upon said frame and projecting therefrom in the same direction as said spindle and substantially parallel thereto and so disposed as to engage said container as said spindle is inserted into said openings and to support said container, and a plurality of stop formations disposed at equal distances from said frame whereby said container is positioned in spaced and parallel relation to said frame while said container is supported by said springs.

29. Film handling apparatus, including a spindle, a film container having a spindle receiving opening therein larger than said spindle, and positioning and latching mechanism coacting between said container and a portion of said apparatus relatively adjacent said spindle and effective upon a single assembling movement of said container toward said apparatus with the axis of said opening moving approximately along the line of the axis of said spindle for first positioning and thereafter maintaining the periphery of said opening in said container in spaced relation to said spindle.

30. Film handling apparatus, including a spindle adapted to support a film, a container and an unmounted film spool positioned therewithin and bodily and rotationally movable relatively thereto, said container and said spool being mountable and demountable as a unit upon and from said apparatus, said container and spool having openings for the reception of said spindle, the spindle receiving opening in said container being substantially larger than said spindle, and positioning and latching mechanism carried by said apparatus for engaging peripheral edge portions of said container to first position and thereafter maintain the periphery of said opening in said container in spaced relation to said spindle, said mechanism being arranged for cooperation with said spindle axially to align the spindle receiving openings in said container and said spool upon the mounting of said container and said spool as a unit upon said apparatus.

31. A film holder for releasable attachment on a film handling apparatus, said holder including a flat approximately cylindrical film enclosing housing of relatively light construction, a hinged plate having said housing fastened to one side thereof, a second similar housing fastened to the same side of said plate and on the other side of the hinge of said plate, said plate extending a short distance beyond the peripheral side wall portions of said housings which are relatively remote from said hinge, and flange portions on said housings fastened to said plate extensions so as to stiffen the same for engagement by said apparatus to attach thereon said holder, said housings and said plate extensions being so arranged that the movement of said plate about said hinge in one direction will expose a length of film between said hinges and a movement of said plate about said hinge in the other direction positions said housings closely together whereby the film is protected.

32. A film handling apparatus and a film container for use therewith, said container including an outer protective housing and an inner film supporting member unmounted relatively to said housing before assembly of said container on said apparatus, said housing and said member being formed with spindle receiving openings therein, means for bringing said openings into axial alignment by the introduction of said spindle therewithin, said container being mountable upon said apparatus as a unit and so removable therefrom, and said apparatus including a frame, a revoluble spindle extending therefrom in a direction substantially at right angles thereto, said spindle being of a diameter materially smaller than the diameter of said spindle receiving opening of said outer protective casing and of substantially the same diameter as that of the spindle receiving opening of said film supporting member whereby friction between said spindle and said housing is prevented while said film supporting member is mounted upon said spindle for revolution therewith, and means for supporting said container upon said apparatus, said supporting means including a plurality of members mounted upon said frame in spaced relation to said spindle and extending therefrom in the same direction as that in which said spindle extends and substantially parallel to said spindle and adapted to engage said housing.

33. A film handling apparatus, including a supporting frame, a film spool, and a spindle mounted upon said apparatus and projecting therefrom and adapted to support said film spool, a container, said film spool being revoluble therewithin and also bodily movable relatively thereto, said container and said spool having openings for the reception of said spindle, said container and said spool being mountable as a unit upon said apparatus and so demountable therefrom, and means coacting between said spool and said container and said apparatus for bringing said spindle receiving openings into alignment upon the introduction of said spindle into said openings as said container is moved into assembled relation with said apparatus, the diameter of the opening in said spool being substantially the same size as the diameter of said spindle whereby said spool may be supported thereby and revolved therewith, and the opening in said container being materially greater than the diameter of said spindle whereby friction between said spindle and said container is prevented during the revolution of said spindle and said spool.

34. Film handling apparatus, including a spindle, a film container having a spindle receiving opening therein, said spindle receiving opening being substantially larger than said spindle, and means coacting between said apparatus at points relatively adjacent said spindle and the periphery of said container for maintaining the edge of said opening in spaced relation to said spindle and for maintaining said container in relatively fixed relation to said apparatus whereby said spindle may be revolved without frictionally engaging any portion of said container.

35. Film handling apparatus, including a spindle, a film container having a spindle receiving opening therein, said spindle receiving opening being substantially larger than said spindle, and spring means coacting between the periphery of the container and a portion of said apparatus relatively adjacent said spindle for maintaining the edge of said opening in spaced relation to said spindle and for maintaining said container in relatively fixed relation to said apparatus.

Signed at New York city, in the county of New York and State of New York, this 28th day of December, A. D. 1928.

WARREN DUNHAM FOSTER.